(12) United States Patent
Tsujiko et al.

(10) Patent No.: US 9,843,072 B2
(45) Date of Patent: Dec. 12, 2017

(54) SECONDARY BATTERY

(71) Applicant: TOYOTA JIDOSHA KABUSHIKI KAISHA, Toyota-shi, Aichi-ken (JP)

(72) Inventors: Akira Tsujiko, Miyoshi (JP); Yasumasa Oguma, Mishima (JP); Michiyuki Ide, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/021,310

(22) PCT Filed: Sep. 18, 2014

(86) PCT No.: PCT/JP2014/074664
§ 371 (c)(1),
(2) Date: Mar. 11, 2016

(87) PCT Pub. No.: WO2015/049996
PCT Pub. Date: Apr. 9, 2015

(65) Prior Publication Data
US 2016/0226096 A1    Aug. 4, 2016

(30) Foreign Application Priority Data

Oct. 1, 2013 (JP) .................. 2013-206422

(51) Int. Cl.
*H01M 10/0562* (2010.01)
*H01M 10/0565* (2010.01)
(Continued)

(52) U.S. Cl.
CPC ....... *H01M 10/0562* (2013.01); *H01M 4/131* (2013.01); *H01M 4/133* (2013.01);
(Continued)

(58) Field of Classification Search
CPC ......... H01M 10/0562; H01M 10/0565; H01M 10/052; H01M 10/0525; H01M 4/131;
(Continued)

(56) References Cited

U.S. PATENT DOCUMENTS

| 6,576,371 B1 | 6/2003 | Yasuda et al. |
| 2009/0061313 A1 | 3/2009 | Tadano |
| 2010/0055565 A1 | 3/2010 | Naoi et al. |

FOREIGN PATENT DOCUMENTS

| CN | 101378135 A | 3/2009 |
| JP | H10-154415 A | 6/1998 |

(Continued)

*Primary Examiner* — Laura Weiner
(74) *Attorney, Agent, or Firm* — Oliff PLC

(57) ABSTRACT

A main object of the present invention is to provide a secondary battery whose performance can be improved. The secondary battery includes a cathode, an anode, and an electrolyte layer arranged between the cathode and the anode, wherein the electrolyte layer includes a cathode side electrolyte layer arranged on a cathode side and an anode side electrolyte layer arranged between the cathode side electrolyte layer and the anode, the cathode side electrolyte layer includes an electrolyte and a binder including a fluorine-based copolymer including tetrafluoroethylene, and the anode side electrolyte layer includes a butadiene-rubber-based binder and an electrolyte.

3 Claims, 13 Drawing Sheets

(51) Int. Cl.
- *H01M 10/052* (2010.01)
- *H01M 4/131* (2010.01)
- *H01M 4/133* (2010.01)
- *H01M 4/62* (2006.01)
- *H01M 4/66* (2006.01)
- *H01M 10/0525* (2010.01)
- *H01M 4/02* (2006.01)

(52) U.S. Cl.
CPC ............ *H01M 4/622* (2013.01); *H01M 4/625* (2013.01); *H01M 4/661* (2013.01); *H01M 10/052* (2013.01); *H01M 10/0525* (2013.01); *H01M 10/0565* (2013.01); *H01M 4/623* (2013.01); *H01M 2004/027* (2013.01); *H01M 2004/028* (2013.01); *H01M 2300/0068* (2013.01); *H01M 2300/0082* (2013.01); *H01M 2300/0094* (2013.01)

(58) Field of Classification Search
CPC ...... H01M 4/133; H01M 4/625; H01M 4/661; H01M 4/622; H01M 4/623; H01M 2004/027; H01M 2004/028; H01M 2300/0082; H01M 2300/0094; H01M 2300/0068

See application file for complete search history.

(56) References Cited

FOREIGN PATENT DOCUMENTS

| | | |
|---|---|---|
| JP | 2000-285929 A | 10/2000 |
| JP | 2010-061912 A | 3/2010 |
| JP | 2013-062228 A | 4/2013 |

SECONDARY BATTERY

TECHNICAL FIELD

The present invention relates to secondary batteries.

BACKGROUND ART

Metal ion secondary batteries (e.g. lithium ion secondary battery, hereinafter sometimes referred to as "all-solid-state battery") having solid electrolyte layers formed from fire retardant solid electrolytes have advantages, for example they can easily simplify the system for securing safety.

As a technique relating to such all-solid-state batteries, for example Patent Literature 1 discloses a lithium secondary battery having a sulfide-based solid electrolyte, wherein a binder formed from a copolymer including polyvinylidene difluoride and tetrafluoroethylene is used. Patent Literature 2 discloses a method for manufacturing an electrode, the method including steps of: forming a coating film consisting of a paint including an active material particle, a binder including styrene-butadiene rubber, and a first solvent, by applying the paint onto a surface of a current collector; and applying a paint including a solid polymeric electrolyte, a binder including polyvinylidene difluoride, and a third solvent, onto the coating film. Patent Literature 3 discloses a solid electrolyte battery including a cathode, a solid electrolyte layer arranged on the cathode and having a multilayer structure of at least two layers, and an anode arranged on the solid electrolyte layer.

CITATION LIST

Patent Literature

Patent Literature 1: JP 2013-62228 A
Patent Literature 2: JP 2010-61912 A
Patent Literature 3: JP 2000-285929 A

SUMMARY OF INVENTION

Technical Problem

For example, in the technique disclosed in Patent Literature 1, when a copolymer of vinylidene difluoride and tetrafluoroethylene is used as a vinylidene fluoride copolymer, a reduction reaction of tetrafluoroethylene occurs at a potential environment in which metal ions are absorbed/released to/from anode active materials (hereinafter the environment may be referred to as "anode potential"). As a result, the capacity of the battery degrades, which results in a problem that the performance of the battery is difficult to be improved. In order to solve this problem, it can be considered for example that the styrene butadiene rubber disclosed in Patent Literature 2 is used instead of the polymer disclosed in Patent Literature 1. However, an electrolyte layer having the styrene butadiene rubber tends to have a lower metal ion conductivity than that of the electrolyte layer having the polymer disclosed in Patent Literature 1. Therefore, it is difficult to improve the performance of the battery, even though the technique disclosed in Patent Literature 2 is used. This problem is difficult to be solved even though the techniques disclosed in Patent Literatures 1 to 3 are combined.

An object of the present invention is to provide a secondary battery whose performance can be improved.

Solution to Problem

As a result of intensive researches, the inventors of the present invention found the followings:
(1) By making an electrolyte (hereinafter, an electrolyte including: a monomer including an element which forms a compound by a reaction with a metal ion at the anode potential; and a polymeric binder having PVdF may be referred to as "PVdF electrolyte") including tetrafluoroethylene (hereinafter it may be referred to as "TFE") and polyvinylidene difluoride (hereinafter it may be referred to as "PVdF") have contact with an anode, a reduction reaction of the monomer (TFE in the above example) included in the PVdF electrolyte occurs at the anode potential;
(2) By arranging an electrode including a butadiene-based rubber (hereinafter it may be referred to as "BR rubber") between the PVdF electrolyte and the anode (hereinafter this electrolyte may be referred to as "BR electrolyte"), it is possible to prevent the reduction reaction of the above monomer; and
(3) The electrolyte having a two-layered structure of the PVdF electrolyte and the BR electrolyte is superior to a BR electrolyte having the same thickness as that of the electrolyte having the two-layered structure, in conductivity of metal ions. The present invention has been made based on the above findings.

In order to solve the above problems, the present invention takes the following structure. That is, the present invention is a secondary battery including a cathode, an anode, and an electrolyte layer arranged between the cathode and the anode, wherein the electrolyte layer includes a cathode side electrolyte layer arranged on a cathode side and an anode side electrolyte layer arranged between the cathode side electrolyte layer and the anode, the cathode side electrolyte layer includes an electrolyte and a binder including a fluorine-based copolymer including tetrafluoroethylene, and the anode side electrolyte layer includes a butadiene-rubber-based binder and an electrolyte.

Here, in the present invention, the "secondary battery" may have an aqueous electrolyte, or may have a solid electrolyte. The term "binder including a fluorine-based copolymer including tetrafluoroethylene (TFE)" means for example that a polyvinylidene difluoride resin of polymerized tetrafluoroethylene and hexafluoropropylene is used as a binder of the cathode side electrolyte layer. In the present invention, the butadiene-rubber-based binder means not only a butadiene rubber used as a binder (binding material) but also a binder having a polymer of polymerized butadiene rubber and another monomer, such as acrylate-butadiene rubber (ABR) and styrene-butadiene rubber (SBR).

In the secondary battery having the above configuration, the BR electrolyte is arranged between the PVdF electrolyte and the anode. Therefore it is possible to prevent the reaction causing the capacity degradation of the battery at the anode potential. In addition, by using the PVdF electrolyte, it is possible to increase the conducting performance of metal ions. The electrolyte layer having the two-layered structure of the PVdF electrolyte and the BR electrolyte can meet the conditions of strength required for electrolyte layers of secondary batteries (hereinafter the electrolyte layer in which the PVdF electrolyte is used may be referred to as "PVdF electrolyte layer", and the electrolyte layer in which the BR electrolyte is used but the PVdF electrolyte is not used may be referred to as "BR electrolyte layer"). Therefore, by having the above configuration, it is possible to have certain amounts or more of the capacity, conducting performance of metal ions, and strength. Thus it is possible to improve the performance of the secondary battery.

In the present invention, the electrolyte included in the cathode side electrolyte layer and the electrolyte included in the anode side electrolyte layer may be solid electrolytes. When an electrolyte layer having a solid electrolyte (solid electrolyte layer) is made, a binder is used in many cases. By including the cathode side electrolyte layer and the anode side electrolyte layer of the present invention in a solid electrolyte layer of an all-solid-state battery, it is possible to have certain amounts or more of the capacity, conducting performance of metal ions, and strength. Thus it is possible to improve the performance of the all-solid-state battery which is one embodiment of the secondary battery of the present invention.

Advantageous Effects of Invention

According to the present invention, it is possible to provide a secondary battery whose performance can be improved.

DESCRIPTION OF EMBODIMENTS

Hereinafter the present invention will be explained with reference to the drawings. In the following explanation, an all-solid-state battery in which lithium ions move between the cathode and the anode, which is one embodiment of the secondary battery of the present invention, will be mainly shown as an example. However, the present invention is not limited to the embodiment shown below.

Figure 1:
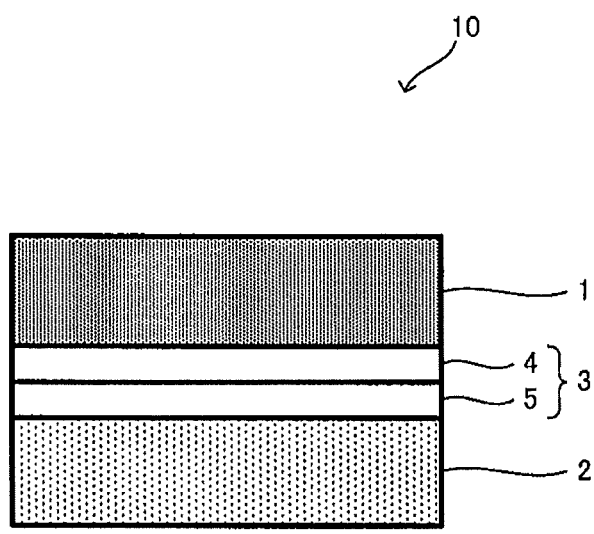
FIG. 1 is a view to explain one embodiment of the secondary battery of the present invention.

FIG. 1 is a view to explain an all-solid-state battery 10 which is one embodiment of the secondary battery of the present invention. In FIG. 1, descriptions of a cathode current collector to be connected to a cathode 1 and an anode current collector to be connected to an anode 2, etc. are omitted. As shown in FIG. 1, the all-solid-state battery 10 includes the cathode 1, the anode 2, and an electrolyte layer 3 arranged between the cathode 1 and the anode 2. The cathode 1 includes a cathode active material which can absorb and release lithium ions, and a solid electrolyte. The anode 2 includes a known anode active material which can absorb and release lithium ions, such as graphite, and a solid electrolyte. The electrolyte layer 3 includes a cathode side electrolyte layer 4 arranged on the cathode 1 side, and an anode side electrolyte layer 5 arranged between the cathode side electrolyte layer 4 and the anode 2.

Figure 2:
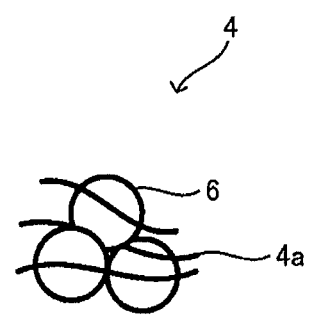
FIG. 2 is a view to explain a cathode side electrolyte layer 4.
Figure 3:
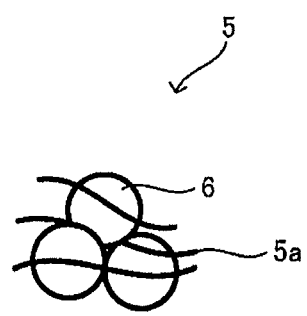
FIG. 3 is a view to explain an anode side electrolyte layer 5.

FIG. 2 is a view to explain a binder 4a and a solid electrolyte 6 which are included in the cathode side electrolyte layer 4. FIG. 3 is a view to explain a butadiene rubber 5a and the solid electrolyte 6 which are included in the anode side electrolyte layer 5. FIG. 2 is an enlarged view of a part of the cathode side electrolyte layer 4. FIG. 3 is an enlarged view of a part of the anode side electrolyte layer 5. In FIGS. 2 and 3, simplified binders and electrolytes are shown.

As shown in FIG. 2, the cathode side electrolyte layer 4 is a solid electrolyte layer including the solid electrolyte 6 and the binder 4a including a fluorine-based copolymer including tetrafluoroethylene (TFE). On the other hand, as shown in FIG. 3, the anode side electrolyte layer 5 is a solid electrolyte layer including the butadiene rubber 5a which functions as a binder, and the solid electrolyte 6. That is, the cathode side electrolyte layer 4 and the anode side electrolyte layer 5 are a PVdF electrolyte layer and a BR electrolyte layer, respectively. In the all-solid-state battery 10, the anode side electrolyte layer 5 which is a BR electrolyte layer is arranged between the cathode side electrolyte layer 4 which is a PVdF electrolyte layer, and the anode 2.

Figure 4:
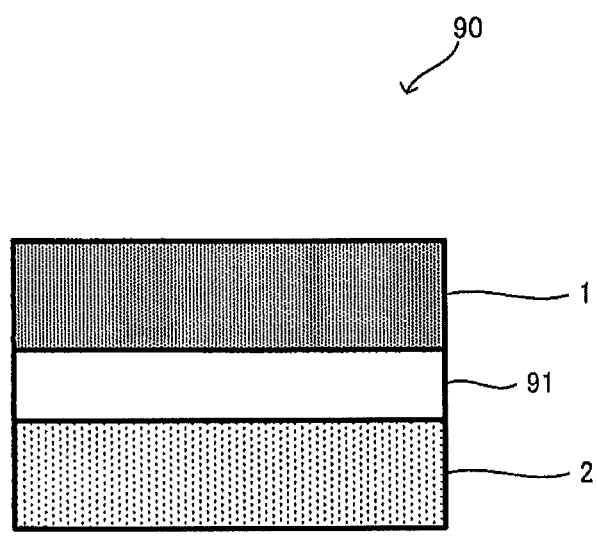
FIG. 4 is a view to explain a conventional all-solid-state battery 90.

FIG. 4 is a view to explain a conventional all-solid-state battery 90. In FIG. 4, for the same structure as that of the all-solid-state battery 10, same signs as those used in FIG. 1 are used, and the explanations thereof are adequately omitted. In FIG. 4, descriptions of a cathode current collector to be connected to the cathode 1 and an anode current collector to be connected to the anode 2, etc. are omitted.

As shown in FIG. 4, the all-solid-state battery 90 includes the cathode 1, the anode 2, and a solid electrolyte layer 91 arranged between the cathode and the anode. The solid electrolyte layer 91 includes a solid electrolyte and a fluorine-based copolymer functioning as a binder, including tetrafluoroethylene (TFE). When the all-solid-state battery 90, in which the solid electrolyte layer 91 which is a PVdF electrolyte layer and the anode 2 have directly contact with each other, is activated, the tetrafluoroethylene (TFE) included in the solid electrolyte layer 91 and lithium react to each other at the contact interface between the solid electrolyte layer 91 and the anode 2 at an anode potential. This reaction is shown in FIG. 5.

Figure 5:
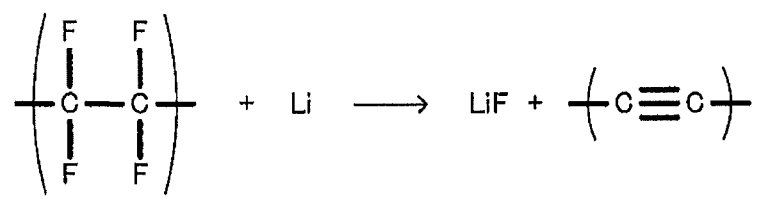
FIG. 5 is a view to explain the reduction reaction of tetrafluoroethylene.

When the reaction shown in FIG. 5 occurs, TFE is reduced and lithium fluoride is produced. The produced lithium fluoride is not absorbed to or leased from the cathode active material or the anode active material. Therefore, when this reaction occurs, the capacity of the battery degrades. Thus the capacity of the all-solid-state battery 90, in which the solid electrolyte layer 91 which is a PVdF electrolyte layer and the anode 2 have directly contact with each other, degrades easily.

In contrast, as shown in FIG. 1, in the all-solid-state battery 10, the anode side electrolyte layer 5 which is a BR electrolyte layer is arranged between the cathode side electrolyte layer 4 which is a PVdF electrolyte layer and the anode 2. Therefore, by the anode side electrolyte layer 5, the cathode side electrolyte layer 4 which is a PVdF electrolyte layer and the anode 2 are prevented from having contact with each other. By the PVdF electrolyte layer and the anode prevented from having contact with each other like in the all-solid-state battery 10, the reaction of producing lithium fluoride (reaction in which metal ions which move between the cathode and anode change to a form not absorbed to or released from the cathode active material or the anode active material) does not occur even at the anode potential. By preventing the reaction, it is possible to prevent capacity degradation. Therefore, the all-solid-state battery 10 can improve its capacity than the all-solid-state battery 90.

Figure 6:
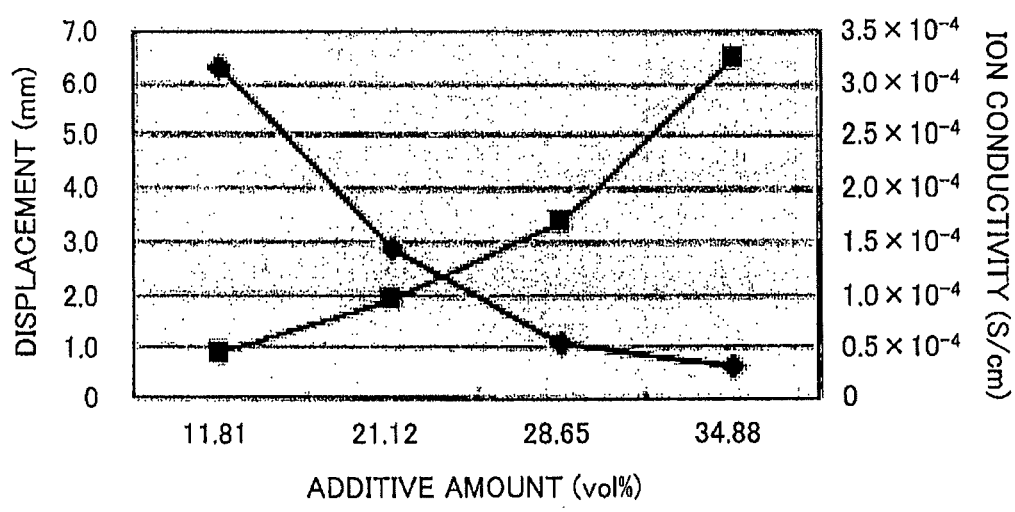
FIG. 6 is a graph showing the relationship between the additive amount of binder and the strength and ion conductivity of a solid electrolyte layer.

Further, the all-solid-state battery 10 includes the cathode side electrolyte layer 4 which is a PVdF electrolyte layer. With the PVdF electrolyte layer, it is easy to keep certain levels or more of strength and ion conductivity of the electrolyte layer 3. Therefore, according to the present invention, it is possible to provide the all-solid-state battery 10 whose performance is improved, by having a certain amounts or more of the capacity, conducting performance of metal ions, and strength. It is noted that, the strength and the ion conductivity of an electrolyte layer generally have a trade-off relationship, and it is required that the electrolyte layer has a certain amount or more of strength, in view of preventing short circuit and the like. FIG. 6 shows the relationship between: the additive amount of the fluorine-based copolymer including tetrafluoroethylene (TFE); and the displacement and ion conductivity at which the occurrence of cracks on the electrolyte was confirmed when a similar test as the bending strength measurement test which is described later was carried out. In FIG. 6, the displacement (mm) is taken along the left side vertical axis, the ion conductivity (S/cm) is taken along the right side vertical axis, and the additive amount (vol %) of the copolymer is taken along the horizontal axis. In FIG. 6, the increasing line shows the results of the displacement, and the decreasing line shows the results of the ion conductivity. The displacement and the strength of the electrolyte shown in FIG. 6 have relations, and it can be considered that the larger the displacement at which cracks start to occur, the greater the strength of the electrolyte is. Though the strength can easily improve if the amount of the binder to be included in the electrolyte (solid electrolyte layer) increases, the ion conductivity easily gets degraded, as shown in FIG. 6.

In the present invention, the configurations of the cathode and the anode are not particularly limited, and the configurations of the cathode current collector to be connected to the cathode and the anode current collector to be connected to the anode are not particularly limited either.

As the cathode active material to be included in the cathode, a known cathode active material which can be used for secondary batteries can be adequately used. Examples of the cathode active material include lithium cobalt oxide ($LiCoO_2$), lithium nickelete oxide ($LiNiO_2$), layered rock salt active materials such as $LiNi_{1/3}CO_{1/3}Mn_{1/3}O_2$, spinel type active materials such as lithium manganate ($LiMn_2O_4$) and $Li(Ni_{0.5}Mn_{1.5})O_4$, olivine type active materials such as $LiFePO_4$, $LiMnPO_4$, $LiCoPO_4$, $LiNiPO_4$, and the like. The cathode active material can be formed in a particle or a thin film for example. The average particle size ($D_{50}$) of the cathode active material is preferably no less than 1 nm and more preferably no less than 10 nm for example. Further, the average particle size ($D_{50}$) of the cathode active material is preferably no more than 100 μm and more preferably no more than 30 μm for example. The containing amount of the cathode active material in the cathode layer is not particularly limited, and preferably no less than 40% and no more than 99% by mass, for example.

In addition, a known binder which can be included in a cathode of secondary batteries can be used for the cathode. Examples of the binder include butadiene-based rubbers, fluorine-based resin and fluorine-based rubbers.

Further, the cathode may include a conductive material for improving electrical conductivity. Examples of the conductive material which can be included in the cathode include carbon materials such as vapor-grown carbon fiber, acetylene black (AB), Ketjen black (KB) carbon nanotube (CNT), and carbon nanofiber (CNF), and metal materials which can endure the environment in which a secondary battery is used.

In addition, in a case where the secondary battery of the present invention is an all-solid-state battery for example, not only the solid electrolyte layer, but also the cathode and the anode can include a known solid electrolyte which can be used for all-solid-state batteries, if necessary. Examples of such a solid electrolyte include oxide-based amorphous solid electrolytes such as $Li_2O-B_2O_3-P_2O_5$ and $Li_2O-SiO_2$, sulfide-based amorphous solid electrolytes such as $Li_2S-SiS_2$, $LiI-Li_2S-SiS_2$, $LiI-Li_2S-P_2S_5$, $LiI-Li_2S-P_2O_5$, $LiI-Li_3PO_4-P_2S_5$, and $Li_2S-P_2S_5$, crystalline solid electrolytes such as LiI, $Li_3N$, $Li_5La_3Ta_2O_{12}Li_7La_3Zr_2O_{12}$, $Li_6BaLa_2Ta_2O_{12}$, $Li_3PO_{(4-3/2w)}N_w$ (w<1), and $Li_{3.6}Si_{0.6}P_{0.4}O_4$, glass ceramics such as $Li_7P_3S_{11}$ and $Li_{3.25}P_{0.75}S_4$, sulfide-based crystalline solid electrolytes of thio-LISIO-based crystal and the like such as $Li_{3.25}P_{0.25}Ge_{0.76}S_4$, and the like. However, it is preferable to use sulfide solid electrolytes (sulfide-based amorphous solid electrolytes and sulfide-based crystalline solid electrolytes) for the solid electrolyte, in view of manufacturing electrodes for all-solid-state batteries which easily can increase the performance of all-solid-state batteries.

In a case where the cathode is manufactured with a cathode composition in a slurry form adjusted by a dispersion of the cathode active material, the solid electrolyte, and the like in a liquid, examples of the liquid which can be used include heptane and the like, and a non-polar solvent can be preferably used. The thickness of the cathode is, for example, preferably no less than 0.1 μm, and more preferably no less than 1 μm. The thickness of the cathode is preferably no more than 1 mm, and more preferably no more than 100 μm.

As the anode active material to be included in the anode, known anode active materials which can absorb/release lithium ions can be adequately used. Examples thereof include carbon active materials, oxide active materials, metal active materials, and the like. The carbon active materials are not particularly limited as long as they include carbon, and examples thereof include mesocarbon microbeads (MCMB), Highly Oriented Pyrolytic Graphite (HOPG), hard carbon, soft carbon, and the like. As the oxide active materials, for example $Nb_2O_5$, SiO and the like can be given. As the metal active materials, for example In, Al, Si, Sn, and the like can be given. As the anode active material, a lithium-containing metal active material can be used. The lithium-containing metal active material is not particularly limited as long as it is an active material including at least Li. It may be a Li metal, or may be a Li alloy. As the Li alloy, an alloy including Li and at least one kind selected from In, Al, Si, and Sn may be given. The shape of the anode active material can be a particle or a thin film for example. The average particle size ($D_{50}$) of the anode active material is, for example, preferably no less than 1 nm, and more preferably no less than 10 nm. The average particle size ($D_{50}$) of the anode active material is, for example, preferably no more than 100 μm, and more preferably no more than 30

µm. The content of the anode active material in the anode is, though not particularly limited, preferably no less than 40% and no more than 99% by mass for example.

Further, the anode may include a conductive material for improving electrical conductivity. As the conductive material which can be included in the anode, the above-described conductive materials which can be included in the cathode, and the like can be given. In a case where the anode is manufactured with an anode composition in a slurry form adjusted by a dispersion of the above-described anode active material and the like in a liquid, heptane and the like can be given as examples of the liquid for dispersing the anode active materials and the like, and a non-polar solvent can be preferably used. The thickness of the anode is, for example, preferably no less than 0.1 µm, and more preferably no less than 1 µm. Further, the thickness of the anode is preferably no more than 1 mm, and more preferably no more than 100 µm.

In a case where the secondary battery of the present invention is an all-solid-state battery, a known solid electrolyte which can be used for all-solid-state batteries can be adequately used for the electrolyte layer (both of the PVdF electrolyte layer and the BR electrolyte layer. Hereinafter, the PVdF electrolyte layer and the BR electrolyte layer may be collectively referred to as "solid electrolyte layer", in a case where the secondary battery of the present invention is an all-solid-state battery and when a common explanation for the PVdF electrolyte layer and the BR electrolyte layer is made). As the solid electrolyte, the above-described solid electrolytes which can be included in the cathode and the anode, and the like can be given as examples. In addition, the solid electrolyte layer includes a binder for binding the solid electrolyte to each other, in view of providing plasticity and the like. It is noted that the content of the binder to be included in the solid electrolyte layer is preferably no more than 5 mass %, in view of making it possible to form a solid electrolyte layer having a solid electrolyte not excessively aggregated but uniformly dispersed, for easily providing a high output power, and the like. In a case where the PVdF electrolyte layer is manufactured through a process of applying onto a base material a solid electrolyte composition in a slurry form adjusted by a dispersion of the above-described solid electrolyte and the like in a liquid, butyl butyrate and the like may be given as examples of the liquid for dispersing the solid electrolyte and the like. In a case where the BR electrolyte layer is manufactured through a process of applying onto a base material a solid electrolyte composition in a slurry form adjusted by a dispersion of the above-described solid electrolyte and the like in a liquid, heptane and the like may be given as examples of the liquid for dispersing the solid electrolyte and the like. The content of the solid electrolyte material in the solid electrolyte layer is, preferably no less than 60%, more preferably no less than 70%, and especially preferably no less than 80%, by mass, for example. The thickness of the solid electrolyte layer (here, it is the total thickness of the PVdF electrolyte layer and the BR electrolyte layer. Hereinafter the same is applied) is, though widely different depending on the structure of the battery, preferably no less than 0.1 µm and more preferably no less than 1 µm for example. Further, the thickness of the solid electrolyte layer is preferably no more than 1 mm and more preferably no more than 100 µm. In the present invention, it is preferable that the thickness of the BR electrolyte layer is thinner than the thickness of the PVdF electrolyte layer, in view of easily increasing the ion conductive performance.

In the present invention, a binder including a fluorine-based copolymer including tetrafluoroethylene (TFE) is used for the PVdF electrolyte layer. The fluorine-based copolymer including tetrafluoroethylene (TFE) which can be used for the PVdF electrolyte layer is not particularly limited as long as the tetrafluoroethylene (TFE) is to undergo a reduction reaction shown in FIG. 5 at an anode potential if the copolymer including tetrafluoroethylene (TEF) should have directly contact with the anode 2. Examples of such a fluorine-based copolymer include: fluorine-based copolymers containing vinylidene fluoride monomeric units, tetrafluoroethylene monomeric units, and hexafluoropropylene monomeric units at a predetermined ratio; fluorine-based polymers such as vinylidene-fluoride-based resin and polytetrafluoroethylene (PTFE); and the like.

In the present invention, a butadiene-based rubber binder is used for the BR electrolyte layer. Examples of the butadiene-based rubber binder which can be used for the BR electrolyte layer include butadiene rubber (BR), acrylate butadiene rubber (ABR), styrene butadiene rubber (SBR), and the like.

For the cathode current collector and the anode current collector, a known metal which can be used for the current collectors of secondary batteries can be used. Examples of the metal include a metal material including one or two or more elements selected from the group consisting of Cu, Ni, Al, V, Au, Pt, Mg, Fe, Ti, Co, Cr, Zn, Ge, and In. The shape of the cathode current collector and the anode current collector is not particularly limited, and a known shape can be applied. In the present invention, the shape of the cathode current collector and the anode current collector can be a foil, a mesh, and the like for example.

The secondary battery of the present invention can have a configuration in which the cathode, the electrolyte layer, the anode, and the like are accommodated in an exterior body. As the exterior body which can be used in the present invention, a known exterior body which can be used for secondary batteries can be used. As the exterior body, a laminate film made of resin, a film where a metal is deposited on a laminate film made of resin, a housing made of stainless steel, and the like can be given as examples.

In the above description regarding the present invention, a case where the secondary battery of the present invention is an all-solid-state battery is mainly described. However, the secondary battery of the present invention is not limited to this embodiment. The secondary battery of the present invention can be a secondary battery having a non-aqueous electrolytic solution for example. In this case, for the non-aqueous electrolytic solution, a known non-aqueous electrolytic solution which can be used for secondary batteries can be adequately used. In a case where the secondary battery of the present invention is a secondary battery having a non-aqueous electrolytic solution, the separator to be arranged between the cathode and the anode may be formed having a multi-layered structure including a plurality of layers continuously arranged in the direction from the cathode to the anode. The layers to be arranged on the cathode side may be functioned as the PVdF electrolyte layer having a porous structure, and the layers to be arranged between the PVdF electrolyte layer and the anode may be functioned as the BR electrolyte layer having a porous structure. More specifically, the separator to be arranged on the cathode side may be functioned as the PVdF electrolyte layer by: in making the separator to be arranged on the cathode side, making a separator having a porous structure by a known method, with a fluorine-based copolymer including tetrafluoroethylene (TFE); and making the separator having a porous structure keep a non-aqueous electrolytic solution. In the same way, the separator to be arranged on the anode side may be functioned as the BR electrolyte layer by: in making the separator to be arranged on the anode side, making a separator having a porous structure by a known method, with a butadiene-based rubber; and making the separator having a porous structure keep a non-aqueous electrolytic solution.

In the above description, an embodiment in which the secondary battery of the present invention is a secondary battery in which lithium ions move between the cathode and the anode (lithium ion secondary battery) is shown as an example. However, the present invention is not limited to this embodiment. Ions other than lithium ions may move between the cathode and the anode of the secondary battery of the present invention. Examples of the ions include sodium ions, potassium ions, and the like. In a case where ions other than lithium ions move in the secondary battery, the cathode active material, the solid electrolyte/non-aqueous electrolytic solution, and the anode active material may be adequately selected depending on the ions to move.

EXAMPLES

1. Making of Specimen for Testing

Synthesis of Solid Electrolyte

Starting raw materials were $Li_2S$ (manufactured by Nippon Chemical Industrial Co., LTD.) and $P_2S_5$ (manufactured by Aldrich). Weighed were 0.7656 g of $Li_2S$ and 1.2344 g of $P_2S_5$. Further, 0.016 g of DENKA BLACK (manufactured by Denki Kagaku Kogyo Kabushiki Kaisha, "DENKA BLACK" is a registered trademark of Kagaku Kogyo Kabushiki Kaisha) was added. Next, these materials were put in an agate mortar and mixed for 5 minutes. Thereafter 4 g of heptane was added therein, and a mechanical milling was carried out for 20 hours at 500 rotations per minute, by means of a planetary ball mill (45 cc, $ZrO_2$ pot, 53 g of $ZrO_2$ balls each having 5 mm in diameter). Thereafter, the resultant material was heated at 110° C. for 1 hour, to remove the heptane. Whereby, a solid electrolyte was obtained.

Cathode Making

Weighed were 12.03 mg of a cathode active material ($LiNi_{1/3}Co_{1/3}Mn_{1/3}O_2$, manufactured by NICHIA CORPORATION), 0.51 mg of a conductive material (vapor-grown carbon fiber, manufactured by SHOWA DENKO K. K.), and 5.03 mg of the above-synthesized solid electrolyte. They were put in a solvent (heptane) and mixed, whereby a cathode composition was obtained. The cathode composition was applied onto a cathode current collector (aluminum foil) and dried. Whereby, a cathode was made on the surface of the cathode current collector.

Anode Making

Weighed were 9.06 mg of an anode active material (graphite, manufactured by Mitsubishi Chemical Corporation) and 8.24 mg of the above-synthesized solid electrolyte. They were put in a solvent (heptane) and mixed, whereby an anode composition was obtained. The anode composition was applied onto an anode current collector (copper foil) and dried. Whereby, an anode was made on the surface of the anode current collector.

Making of PVdF Electrolyte Layer

The above-synthesized solid electrolyte was weighed in an amount of 18 mg. The weighed solid electrolyte, 3.6 mg of a butyl butyrate solution containing 5 wt % of a fluorine-based copolymer containing tetrafluoroethylene (TFE) (fluorine-based copolymer including TFE, containing vinylidene fluoride monomeric units, tetrafluoroethylene monomeric units, and hexafluoropropylene monomeric units at a rate of vinylidene fluoride monomeric unit:tetrafluoroethylene monomeric unit:hexafluoropropylene monomeric unit=55 mol %:25 mol %:20 mol %), and 30.3 mg of butyl butyrate were mixed. Whereby, a PVdF electrolyte composition was obtained. The PVdF electrolyte composition was applied onto an aluminum foil, and further dried. Thereafter the aluminum foil was peeled off, whereby a PVdF electrolyte layer was made.

Making of BR Electrolyte Layer

The above-synthesized solid electrolyte was weighed in an amount of 18 mg. The weighed solid electrolyte, 3.6 mg of a heptane solution containing 5 wt % of BR, and 30.3 mg of heptane were mixed. Whereby, a BR electrolyte composition was obtained. The BR electrolyte composition was applied onto an aluminum foil, and further dried. Thereafter the aluminum foil was peeled off, whereby a BR electrolyte layer was made. The BR electrolyte layer was made so as to have the same thickness as that of the above-made PVdF electrolyte layer.

Making of Electrode Body

Figure 7:
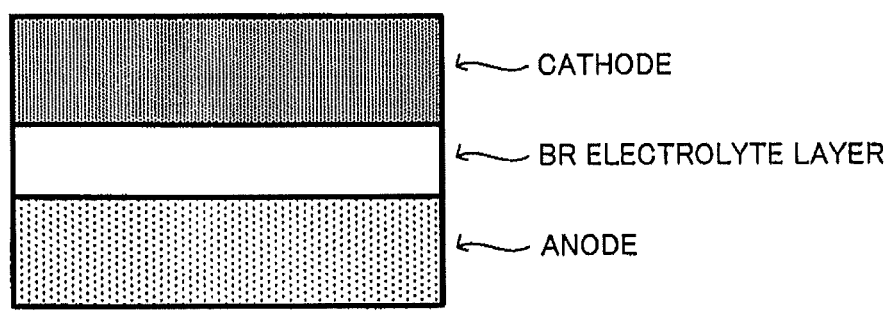
FIG. 7 is a view to explain an electrode body A.

The cathode made on the surface of the cathode current collector, the anode made on the surface of the anode current collector, and the BR electrolyte layer was layered so that the BR electrolyte layer was arranged between the cathode and the anode. Thereafter, they were pressed, whereby an electrode body A was made. The Electrode body A is shown in FIG. 7. The description of the cathode current collector and the anode current collector in FIG. 7 are omitted, so that FIG. 7 corresponds to FIGS. 1 and 4 wherein the descriptions of the cathode current collector and the anode current collector are omitted.

The cathode made on the surface of the cathode current collector, the anode made on the surface of the anode current collector, and the PVdF electrolyte layer were layered so that the PVdF electrolyte layer was arranged between the cathode and the anode. Thereafter they were pressed, whereby an electrode body B which has the same configuration as that of the all-solid-state battery 90 was made.

In addition, the cathode made on the surface of the cathode current collector, the anode made on the surface of the anode current collector, the PVdF electrolyte layer, and the BR electrolyte layer were layered so that the PVdF electrolyte layer and the BR electrolyte layer were arranged between the cathode and the anode, and the cathode had contact with the PVdF electrolyte layer and the anode had contact with the BR electrolyte layer. Thereafter they were pressed, whereby an electrode body C having the same configuration as that of the all-solid-state battery 10 was made.

2. Bending Strength Measurement Test

Figure 8A:
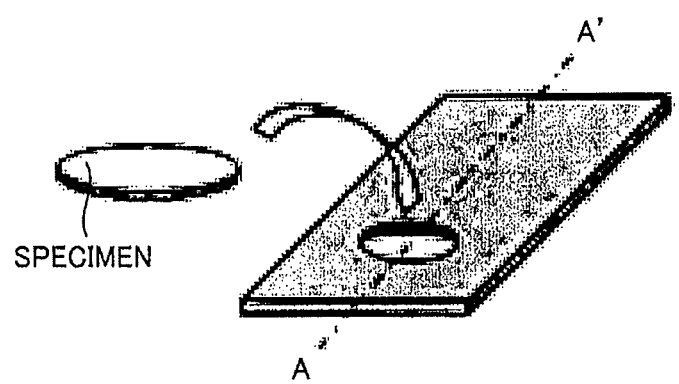
FIG. 8A is a perspective view to explain a bending strength measurement test.
Figure 8B:
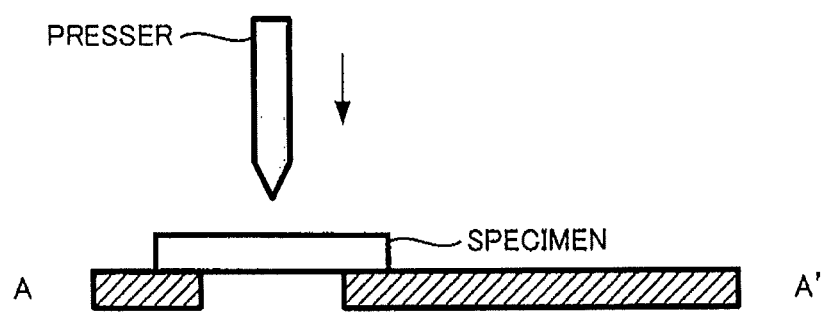
FIG. 8B is a cross-sectional view to explain the bending strength measurement test.
Figure 8C:
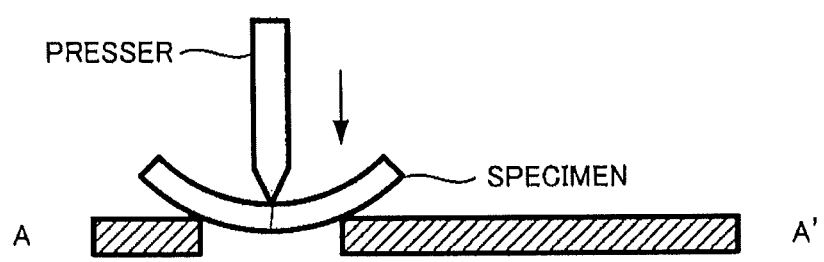
FIG. 8C is a cross-sectional view to explain the bending strength measurement test.
Figure 9:
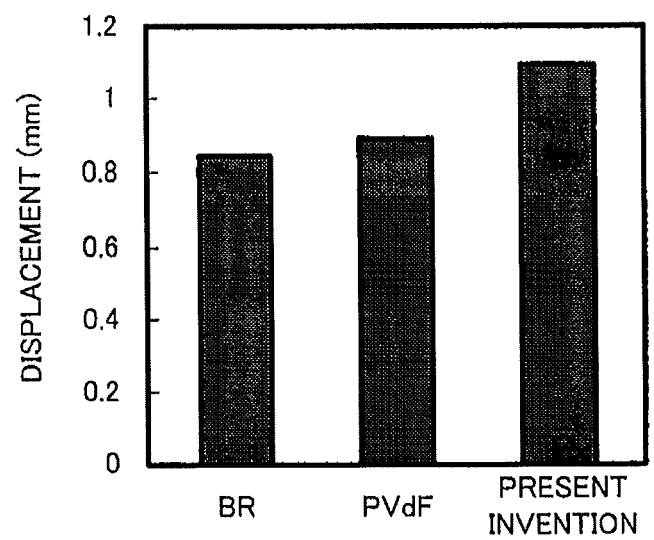
FIG. 9 is a graph showing the results of the bending strength measurement test.

The bending strengths of the BR electrolyte layer and the PVdF electrolyte layer were measured by means of a particle compaction machine (MCT series, manufactured by Shimadzu Corporation). The general description of the bending strength measurement test is shown in FIGS. 8A, 8B, and 8C. FIG. 8A is a perspective view explaining the situation of the arrangement of the electrolyte layers (BR electrolyte layer and PVdF electrolyte layer) of 13 mm in diameter, in a hole of 8 mm in diameter arranged on the test board of the particle compaction machine. FIG. 8B is a cross sectional view cut along A-A' in FIG. 8A, explaining the situation before the specimen arranged on the test board was pushed in by a presser. FIG. 8C is a cross sectional view cut along A-A' in FIG. 8A, explaining the situation in which the specimen arranged on the test board was pushed in by the presser. In the bending strength measurement test, the specimen was pushed in by the presser, and the displacement up to the position at which the occurrence of cracks on the specimen was visually confirmed was measured. The results are shown in FIG. 9. The "BR" in FIG. 9 is the result of the bending strength test in which two BR electrolyte layers overlapping each other were pushed in by the presser, the "PVdF" is the result of the bending strength test in which two PVdF electrolyte layers overlapping each other were pushed in by the presser, and the "present invention" is the result of the bending strength test in which one BR electrolyte layer and one PVdF electrolyte layer overlapping each other (two electrolyte layers in total) were pushed in by the presser.

As shown in FIG. 9, the strength of the PVdF electrolyte layer was higher than that of the BR electrolyte layer, and the strength of the "present invention" was higher than the "PVdF". It is considered that the reason of the higher strength of the "present invention" than the "PVdF" is that the "present invention" had a higher strength than a case where only the PVdF electrolyte layer was used because a balance of the strengths of the PVdF electrolyte layer and the BR electrolyte layer was obtained, by overlapping the BR electrolyte layer softer than the PVdF electrolyte layer and the PVdF electrolyte layer harder than the BR electrolyte layer. From the above results, it was found that an electrolyte layer of the PVdF electrolyte layer and the BR electrolyte layer overlapping each other may have a strength same as or higher than that of the PVdF electrolyte layer.

3. Ion Conductivity Measurement Test

Figure 10:
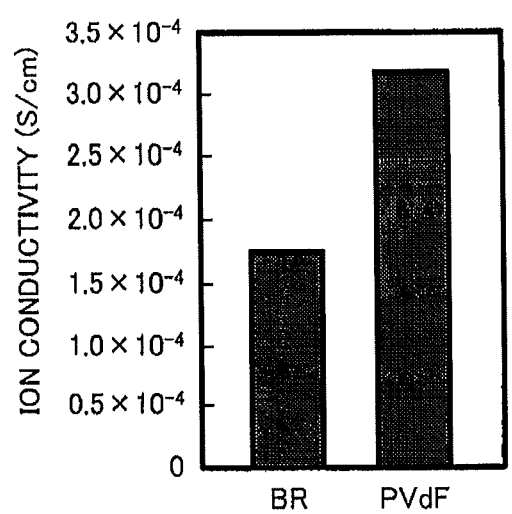
FIG. 10 is a graph showing the results of an ion conductivity measurement test.

The ion conductivities of the BR electrolyte layer and the PVdF electrolyte layer were measured by means of an impedance measurement device (1470E CellTest System, manufactured by TOYO Corporation). The results are shown in FIG. 10. The "BR" in FIG. 10 is the measurement result of the ion conductivity of the BR electrolyte layer, and the "PVdF" is the measurement result of the ion conductivity of the PVdF electrolyte layer.

As shown in FIG. 10, the ion conductivity of the PVdF electrolyte layer was higher than the BR electrolyte layer.

4. Capacity Measurement Test

Capacity measurement was carried out on the manufactured electrode body A, electrode body B, and electrode body C, by means of a charge/discharge device (TOSCAT-3200, manufactured by TOYO SYSTEM CO., LTD.). It is noted that the electrode body A, electrode body B, and electrode body C had a same structure except the structure of their electrolytes, and the same test conditions of the capacity measurement were applied. The thickness of the BR electrolyte layer of the electrode body A (thickness in the vertical direction of the sheet surface of FIG. 7) was same as that of the PVdF electrolyte layer of the electrode body B (thickness in the vertical direction of the sheet surface of FIG. 4), and same as the total thickness of the BR electrolyte layer and the PVdF electrolyte layer of the electrode body C (thickness in the vertical direction of the sheet surface of FIG. 1). The results of the capacity measurement test are shown in FIG. 11.

Figure 11:
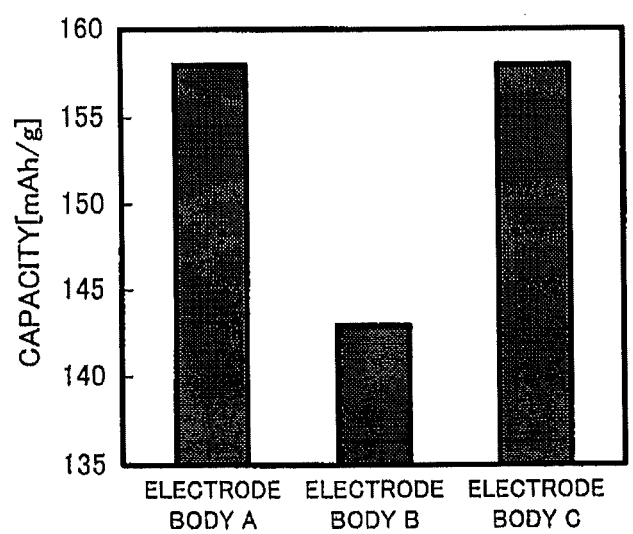
FIG. 11 is a graph showing the results of a capacity measurement test.

As shown in FIG. 11, the capacities of the electrode bodies A and C were nearly same, whereas the capacity of the electrode body B was lower than the capacities of the electrode bodies A and C. It is considered this is because, in the electrode body B, a formation reaction of LiF occurred at the interface between the PVdF electrolyte layer and the anode, since the PVdF electrolyte layer had contact with the anode. It is considered that, in the electrode body C, a reduction reaction of monomer and a formation reaction of LiF did not occur, since the electrode body C had a nearly same capacity as that of the electrode body A in which the PVdF electrolyte layer was not used.

From the above results, it is possible to provide a secondary battery whose performance can be improved, according to the present invention.

REFERENCE SIGNS LIST 1 cathode
2 anode
3 electrolyte layer
4 cathode side electrolyte layer
4a binder
5 anode side electrolyte layer
5a butadiene rubber (butadiene-rubber-based binder)
6 solid electrolyte (electrolyte)
10 all-solid-state battery (secondary battery)

The invention claimed is:

1. An all-solid-state secondary battery comprising:
a cathode;
an anode; and
a solid electrolyte layer arranged between the cathode and the anode, wherein:
the solid electrolyte layer includes a cathode side electrolyte layer arranged on a cathode side and an anode side electrolyte layer arranged between the cathode side electrolyte layer and the anode;
the cathode side electrolyte layer includes an electrolyte and a binder including a fluorine-based copolymer including tetrafluoroethylene monomer units, and
the anode side electrolyte layer includes a butadiene-rubber-based binder and an electrolyte.

2. The all-solid state secondary battery according to claim 1, wherein the fluorine-based copolymer is a polyvinylidenedifluoride copolymer including vinylidene difluoride monomer units and the tetrafluoroethylene monomer units.

3. The all-solid-state secondary battery according to claim 1, wherein the fluorine-based copolymer further includes hexafluoropropylene monomer units.

* * * * *